United States Patent [19]

Barnell et al.

[11] Patent Number: 4,971,503

[45] Date of Patent: Nov. 20, 1990

[54] PLASTIC NAILS FOR AUTOMATIC NAIL GUN

[75] Inventors: Anthony J. Barnell, Liverpool; James J. Palmer, Cazenovia, both of N.Y.

[73] Assignee: Concepts Plastic Corporation, Syracuse, N.Y.

[21] Appl. No.: 468,067

[22] Filed: Jan. 22, 1990

[51] Int. Cl.⁵ .............................................. F16B 15/08
[52] U.S. Cl. .................................. 411/443; 411/908; 206/343
[58] Field of Search ............... 411/442, 443, 444, 908; 206/343–347

[56] References Cited

U.S. PATENT DOCUMENTS

| | | |
|---|---|---|
| 3,165,968 | 1/1965 | Anstett . |
| 3,252,569 | 5/1966 | Matthews . |
| 3,348,669 | 10/1967 | Powers . |
| 3,492,907 | 2/1970 | Hauck . |
| 3,915,299 | 10/1975 | Miyaoku . |
| 4,456,123 | 6/1984 | Russell ............................. 206/343 |
| 4,664,733 | 5/1987 | Masago ............................. 411/443 |
| 4,826,381 | 5/1989 | Kiriyama ........................... 411/443 |

FOREIGN PATENT DOCUMENTS 2250375 10/1972 Fed. Rep. of Germany ...... 206/345

Primary Examiner—Neill R. Wilson
Attorney, Agent, or Firm—Wall and Roehrig

[57] ABSTRACT

A molded nail pack for use in an automatic nail gun that has a feeder for delivering nails in sequence into a chamber and a hammer for driving a nail in the chamber into a receiving member. The molded pack includes a plurality of nails that are supported in a spaced apart relationship by a first upper web and second lower web molded integrally with adjacent nails. In a second embodiment of the invention, the nails are connected by a vertically disposed web extending between overlapping heads of adjacent nails in the pack. Each web has a weakened section located so that a nail positioned in the gun chamber separates cleanly from the pack when struck by the gun hammer thereby preventing the gun from becoming jammed.

11 Claims, 3 Drawing Sheets

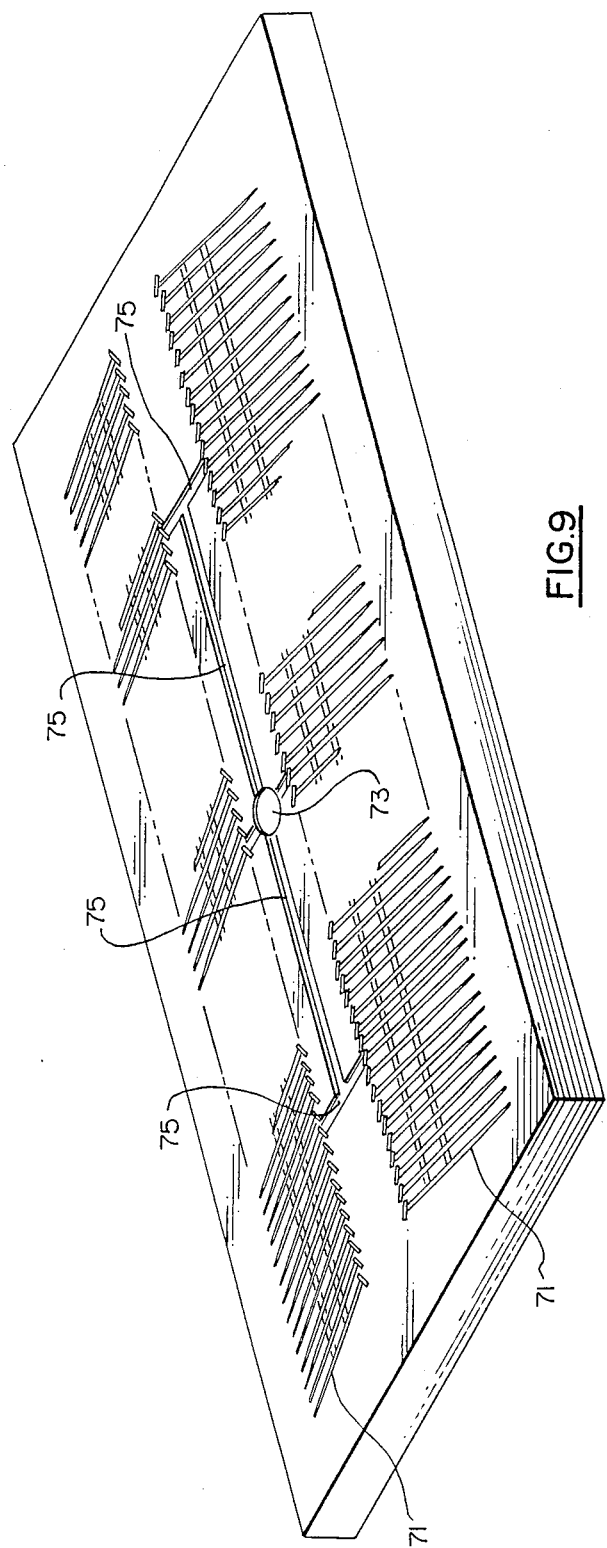

PLASTIC NAILS FOR AUTOMATIC NAIL GUN

BACKGROUND OF THE INVENTION:

This invention relates to a molded clip of conventionally shaped nails that is suitable for use in an automatic nail gun.

An automatic nail gun generally has a feeder that is arranged to deliver nails in sequence from a magazine into a gun chamber. The nails, as received in the chamber are struck by a hammer and driven into a receiving member against which the gun barrel is seated. Nails used in automatic guns are generally formed of metal and are oftentimes held in spaced apart alignment by flexible bands made of plastic or paper. The banded nails are supplied in roll form and the user cuts strips of suitable length to fit the gun machine from the supply roll. The bands, however, are relatively weak making the handling and loading of the strips difficult. Nail losses can also occur by unwanted breakage of the bands or by the nails becoming dislodged from the bands.

Efforts have been made to eliminate some of these problems by molding nails of plastic wherein the plastic nails are held together by integrally molded webs in a clip. Examples of some of these clips are found in U.S. Pat. Nos. 3,492,907, 3,348,669, and 3,165,968. The shape of the nails used in these molded clips are all rather non conventional and require special guns for their utilization. It should be further noted that the plastic nails must be molded from high strength plastic so that they can be driven into various receiving materials. The webs that join the nails in the clip are molded from the same high strength material as the nails. As a consequence, the nails are difficult to separate from the clip as they are being driven from the gun chamber. If the nails do not separate cleanly, the gun will become jammed and/or the nail will be improperly driven into the receiving material. Web material that is left behind in the gun can also disrupt the feeding of nails into the chamber.

Mujaoku, in U.S. Pat. No. 3,915,299 describes a multi-step process for connecting plastic nails in a clip. The nails are molded in half sections so that when the sections are joined together, the shank portion of each nail has a pair of laterally extended holes. The nails are then mounted upon support rods that are passed through the holes. The rods have a lower shearing modulus than the nails whereby the nails are easily separated from the clip during the driving operation. Because of the number of operations required to manufacture this type of clip, the cost of the clips are relatively high. Additionally, placing holes in the nail shank seriously weakens the nail and thus limits the number of nailing applications that can be performed.

OBJECTS AND SUMMARY OF THE INVENTION

It is therefore an object of the present invention to improve nail packs and clips used in automatic nailing guns.

It is a further object to improve molded nail packs used in an automatic nailing gun to prevent the gun from jamming during the nail driving operation.

A still further object of the present invention is to provide a molded nail pack for use in an automatic gun which permits the nail to be cleanly separated from the pack in sequence.

Another object of the present invention is to improve the severability of individual plastic nails from a nail pack without sacrificing nail strength.

Still another object of the present invention is to improve plastic nail packs used in automatic guns so that individual plastic nails are separated from the pack under controlled conditions as the nails are being driven from the gun.

Yet another object of the present invention is to provide a molded nail pack using conventional shaped nails whereby the pack can be utilized in automatic guns that are presently in use.

Yet a further object of the present invention is to improve plastic nails used in automatic nail guns which can be easily molded to various sizes and shapes using different colored plastics to match construction components and which will not oxidize or discolor the construction components and meet any number of building applications.

These and other objects of the present invention are attained by means of a molded nail pack for use in an automatic nail gun of the type having a feeder for delivering nails in sequence into a chamber and a hammer for driving a nail positioned in the chamber into a receiving structure. The clip includes a plurality of plastic nails that are connected by one or more webs. Each web has a weakened section that is positioned so that a nail positioned in the gun chamber cleanly separates from the pack when struck by the hammer to prevent the nail from jamming in the gun or being improperly driven in the receiving structure.

BRIEF DESCRIPTION OF THE DRAWINGS

For a better understanding of these and other objects of the present invention, reference will be made to the following detailed description of the invention which is to be read in conjunction with the accompanying drawings, wherein:

FIG. 9 is a perspective view showing a mold in an open condition that is used in molding nail packs of the present invention.

DETAILED DESCRIPTION OF THE PREFERRED EMBODIMENT

Figures 1, 4:
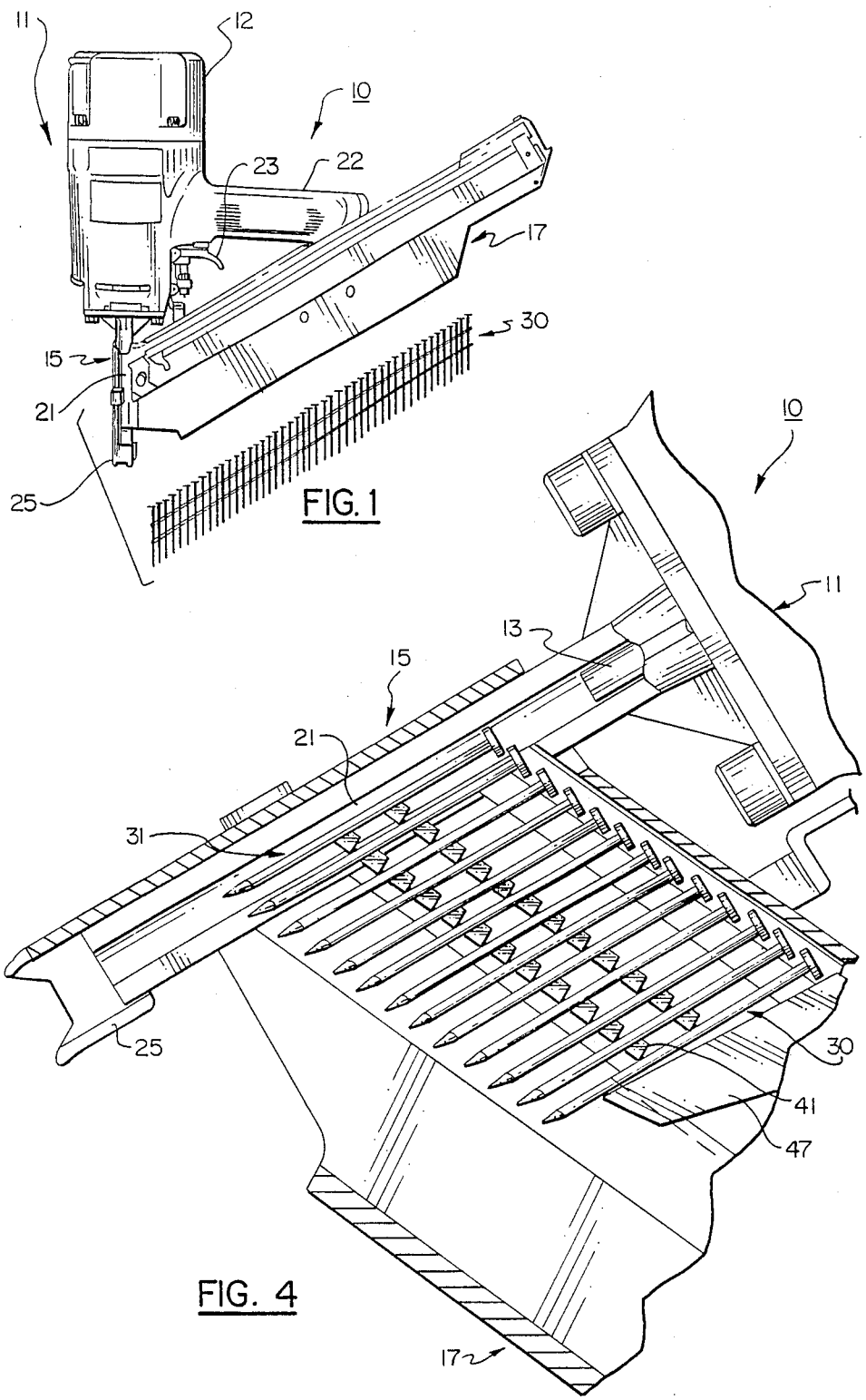
FIG. 1 is a side elevation of an automatic nail gun which utilizes a nail pack embodying the teachings of the present invention.
FIG. 4 is a partial enlarged view in section showing the nail feeding and driving mechanism of the automatic nail gun illustrated in FIG. 1.

Turning initially to FIGS. 1 and 4, there is shown an automatic nail gun, generally referenced 10, of common design. The gun includes a main casing 11 upon which is situated a drive motor 12 for driving the gun hammer 13 (FIG. 4) reciprocatively along the gun barrel 15. A magazine 17 is attached to the barrel which has a feeder for sequentially delivering nails from a pack, as for example pack 30, into the chamber 21 of the barrel. The gun further includes a hand grip 22, and trigger mechanism 23 which allows the operator to place the tip 25 of the gun barrel against an intended target. Depressing the trigger causes the hammer to move down the barrel and thus separate the nail situated in the chamber from the pack and drive it into the target. As the hammer is retracted to its home position, the leading nail in the pack is automatically delivered into the chamber by the feeder. The sequence is repeated until the nails in the pack are depleted whereupon a new pack is loaded into the magazine.

Figure 2:
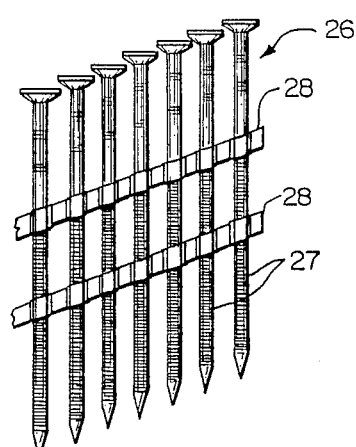
FIG. 2 is a side elevation illustrating a nail pack used in the prior art.

One form of packaging 26 used in the art is shown in FIG. 2 Individual metal nails 27—27 are threaded into flexible paper or plastic bands 28—28 which hold the nails in a desired spaced apart parallel alignment that is compatible with a specific gun or guns. As noted above, inserting the nails into the bands is a difficult and time consuming task that increases the unit cost of the nails. The flexible bands also make the packs difficult to handle and load in the gun magazine. Because the nails are not rigidly supported, the nails can become misaligned in the magazine, and thus produce misfeeds and jamming of the gun. The bands are also easily broken when handled and, as a consequence, nails can become dislodged and lost.

As will be explained in greater detail below, the present invention involves a molded nail package 30 (FIG. 3) that contains plastic nails 31—31 that are each interconnected by integrally molded upper webs 32 and lower webs 33. Each molded nail is of conventional design containing a cylindrical shank 35 having an expanded circular head 36 at its proximal end and a pointed tip 37 at its distal end. The webs and the nails are molded from the same plastic material in a single operation. Preferably, the plastic is selected from any one of a group of thermoplastics having high impact resistance and high tensile strength which allows the nails to be driven to full depth into wooden members or the like without breaking. Such plastics are available through numerous companies, and include such materials as ultem, nylon, A.B.S., polyester, polyphenoleneoxide, and polycarbonate. These materials are sometimes referred to as "Engineering Resins".

The packs can be easily molded to a desired length with the nails properly spaced for a desired gun. Additionally, because the webs connecting adjacent nails in the pack are rigid, the nails in the pack cannot become twisted or misaligned when being handled or fed into a gun chamber thereby reducing gun damage and nail loss.

Figure 3:
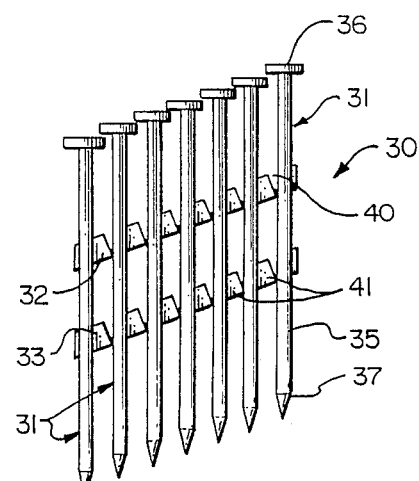
FIG. 3 is a side elevation similar to that shown in FIG. 2 illustrating a nail pack embodying the teachings of the present invention.

In the nail pack 30 shown in FIG. 3, the nails are aligned in the pack in a stacked configuration with the expanded head of each upstream nail overlying the head of the adjacent downstream nail. The terms "upstream" and "downstream" are used herein to define the positions of nails in regard to the direction of travel that the nails follow as they are fed into the gun chamber. To insure that each nail will separate cleanly from the pack when it is struck by the gun hammer, each web is furnished with a weak section along which the nail will shear under closely controlled conditions when it is struck by the hammer. The webs, as shown in FIG. 3, are weakened by molding a vertically extended cutout 40 in the web, close to the point where the web joins the shank of the upstream nail which, in turn, produces a weakened section 41—41 in each web.

Turning now to FIG. 4, the pack 30 is shown loaded in the gun magazine with the first nail in the pack positioned in the gun chamber. The weakened web sections 41—41 are located a predetermined distance from the shank of the first nail so that they lie inside the chamber boundaries. The first nail, upon being struck, will break away cleanly from the pack and the sheared section of the web carried out of the chamber with the nail. The sheared web section is then stripped from the nail shank as it penetrates the receiving member. In this embodiment of the invention, the hammer body is contoured so that it can clear the head of the second nail in the pack while still centering the blow along the axis of the shank of the nail that is being driven.

Once the first nail has cleared the chamber and the hammer is retracted, the feeder arm 47, located in the magazine, urges the second nail forward into the empty chamber. Here again, it is important to note that by controlling where the weakened web sections occur, the length of the severed web remnant remaining with the second nail can also be regulated so that it will not interfere with seating and alignment of the second nail within the gun chamber. As can be seen, if these web remnants are overly long, the nail will be prevented from being properly seated beneath the hammer. Extending the hammer into contact with a misaligned nail will cause the gun to jam and potentially cause damage to the jammed gun mechanism.

Figure 5:
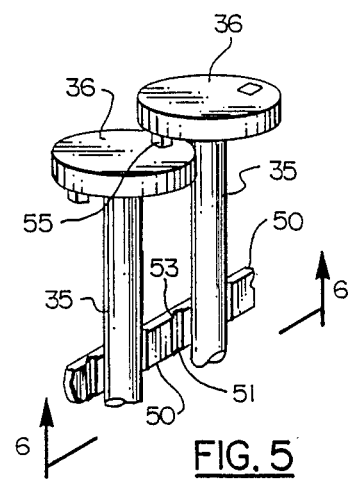
FIG. 5 is an enlarged partial perspective view showing a second embodiment of the present invention.
Figure 6:
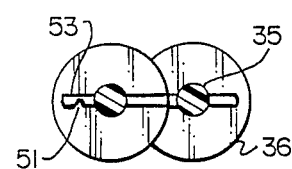
FIG. 6 is a bottom view taken along lines 6—6 in FIG. 5.

A second embodiment of the invention is shown in FIGS. 5 and 6. In this embodiment, a single horizontal web 50 is used to join the shank portions 35—35 of two adjacent nails 31—31. The horizontal web has a horizontally disposed cutout 51 formed therein which runs the full height of the web to provide a weakened section 53 close to the shank of the upstream nail. Again, this section is located so that the severed web portions will not hinder the operation of the gun or the driving of a nail. Additionally, a second vertically disposed web 55 is molded integrally with the superimposed heads of adjacent nails. The web extends from the underside of the head of the upstream nail to the top side of the head of an adjacent downstream nail. The vertical web lies outside the striking area of the contoured hammer and is easily sheared by the downward force of the hammer striking the downstream nail. Although not clearly shown in the drawings, the vertically disposed upper web 55 is also furnished with a cutout that weakens the web at the head of the downstream nail so that the web severs cleanly at the head at impact so that a clean head is provided at the nailed structure. In this embodiment of the invention, the horizontal web can be omitted without departing from the teachings of the present invention.

Figure 7:
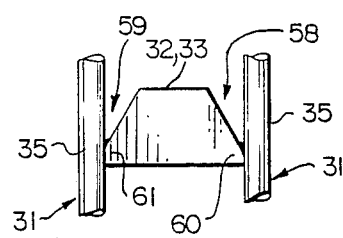
FIG. 7 is a partial side elevation showing a further embodiment of the invention.

FIG. 7 illustrates a further embodiment of the invention wherein the pack contains upper and lower webs as shown in FIG. 3 which connect the shank portions 35—35 of adjacent nails. Each web has a pair of cutouts 58 and 59 situated at the opposing shank portions. Cutout 58 is near the upstream nail and provides a relatively small weakened section 60 where the web joins the upstream shank. The second cutout 59 is near the downstream nail shank and is formed so that a second weakened section 61 is provided where the web joins the downstream shank. The area of the second weakened section is greater than that of the first so that they will separate from the nails in an ordered sequence. Section 60 is designed to break away from the pack when the downstream nail is struck by the hammer. The larger section 61 is designed to shear away as the driven nail penetrates into the nail receiving structure.

Figure 8:
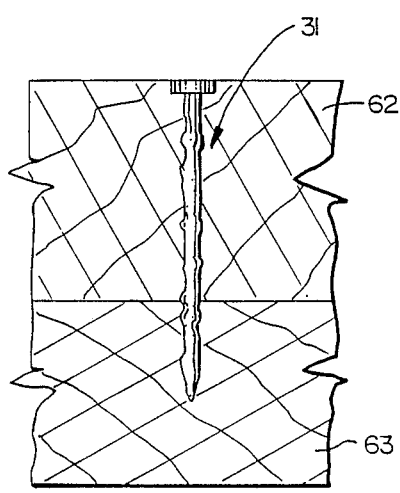
FIG. 8 is a side elevation in section showing a plastic nail of the present invention driven into two wooden members.

As shown in FIG. 8, a plastic nail 31 will typically be used to join two wooden members into a unit. After the web tabs are sheared from the nail shank, the nail penetrates to its full depth into the unit. This generates a good deal of heat at the nail surface whereupon this portion of the nail is plasticized sufficiently so that the softened plastic flows into fractures and voids along the nail's path of travel. As can be seen, the nail thus becomes firmly seated within the receiving members.

FIG. 9 shows one half 70 of a split mold suitable for manufacturing the present nail packs. This mold is designed to produce two packs at the same time. The mold half is provided with cavities 71 defining the nails and the webs. Plastic is injected into the center of the mold at a central entrance 73 and is distributed into the mold cavities by means of a runner network 75—75. Although not shown, the other half is similarly contoured and is arranged to close against the first half prior to injecting the plastic. As can be seen, the mold is of conventional design and accordingly, the packs can be conveniently and inexpensively produced without the need of special equipment.

While this invention has been explained with reference to the structure disclosed herein, it is not confined to the details as set forth and this application is intended to cover any modifications and changes as may come within the scope of the following claims.

What is claimed is:

1. A molded nail pack for use in an automatic nail gun having a feeder for delivering nails in sequence into a chamber and a hammer for driving a nail positioned in the chamber into a receiving structure, said nail clip including
    a plurality of plastic nails, each nail having a cylindrical shank, an expanded circular head at the top of the shank, and a pointed tip at the bottom of the shank,
    a first upper rigid web and a second lower rigid web molded integrally with the shanks of said nails to support the nails in spaced apart alignment to permit the first nail in the series to be delivered into said gun chamber, said first and second webs having a rectangular cross-section with the width, along said cylindrical shanks being substantially greater than the thickness of said webs transversely of said shanks and at least equal to the length between adjacent nail shanks, and
    each web having a weakened section located a predetermined distance from a downstream nail in said series so that said web separates from the clip within said chamber when the head of the downstream nail is struck by the gun hammer whereby the nails are prevented from jamming in said gun.

2. The molded nail pack of claim 1 wherein the weakened section of each web occurs in a region where the web joins the shank of the downstream nail.

3. The molded nail pack of claim 1 wherein the weakened section includes a cutout formed across a major portion of the width of the web.

4. The molded nail pack of claim 1 wherein the weakened section includes a cutout formed in the thickness of the web across the entire width thereof.

5. The molded nail pack of claim 1 wherein each web has a first weakened section close to a downstream nail and a second weakened section close to the adjacent upstream nail so that the sections are sheared in an ordered sequence.

6. The molded nail pack of claim 5 wherein the first section shears when the upstream nail is struck by the gun hammer and the second section is sheared as the driven nail penetrates the receiving structure.

7. The molded nail pack for use in an automatic nail gun having a feeder for delivering nails in sequence into a chamber and a hammer for driving a nail positioned in the chamber into a structure, said nail pack including
    a plurality of plastic nails, each nail having a cylindrical shank, an expanded circular head at the top of the shank, and a pointed tip at the bottom of the shank,
    the nails being positioned such that the head of upstream nails in the series overlap the heads of adjacent downstream nails whereby the nails comprising the nail pack are positioned in ascending order from front to back, and
    a first web disposed parallel to said nail shanks connecting the bottom of the head of an upstream nail to the top of the head of an adjacent downstream nail, said first web being integrally molded with said adjacent nails to support the nails in spaced apart alignment to permit the first nail in the series to be delivered into said gun chamber.

8. The nail pack of claim 7 further including a second web disposed perpendicularly to said nail shanks and integrally molded with said adjacent nails to support the adjacent nail shanks in a spaced apart alignment to permit the first nail in the series to be delivered into said gun chamber, and
    each web having a weakened section positioned so that said webs separate from the upstream nails within said gun chamber when the downstream nail is struck by the gun hammer.

9. A molded nail pack as recited in claim 8 wherein said second web has a weakened section near the shank of said downstream nail.

10. A plastic nail pack as recited in claim 9 wherein said weakened section is near the shank of said downstream nail and wherein a second weakened section is also contained in each second web that is near the shank of the adjacent upstream nail.

11. A plastic nail pack as recited in claim 8 wherein said first web has a weakened section near the head of said downstream nail.

* * * * *